(12) United States Patent
Otani et al.

(10) Patent No.: US 6,970,203 B2
(45) Date of Patent: Nov. 29, 2005

(54) AUTOMATIC CUT-OFF SYSTEM

(75) Inventors: Yutaka Otani, Kyoto (JP); Masahiko Sasada, Kyoto (JP); Nobuo Taketani, Hyogo (JP); Masahiro Takeshima, Osaka (JP); Hiroshi Moribe, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 531 days.

(21) Appl. No.: 10/225,120

(22) Filed: Aug. 22, 2002

(65) Prior Publication Data

US 2003/0038898 A1 Feb. 27, 2003

(30) Foreign Application Priority Data

Aug. 23, 2001 (JP) .............................. 2001-252948

(51) Int. Cl.$^7$ ............................................. H04N 5/68
(52) U.S. Cl. ..................................... 348/380; 315/383
(58) Field of Search ................................. 348/379, 380, 348/377, 378, 173, 805, 682, 692, 697, 696; 315/383, 381, 1; H04N 5/68

(56) References Cited

U.S. PATENT DOCUMENTS

| | | | |
|---|---|---|---|
| 4,514,664 A | * | 4/1985 | Kasagi et al. ............... 315/383 |
| 4,523,222 A | | 6/1985 | Freyberger et al. |
| 4,599,642 A | * | 7/1986 | Willis .......................... 348/379 |
| 5,339,011 A | * | 8/1994 | Tamura et al. ............... 315/383 |
| 5,714,842 A | * | 2/1998 | Krause et al. ................. 315/1 |
| 6,288,503 B1 | * | 9/2001 | Sowig ......................... 315/381 |

FOREIGN PATENT DOCUMENTS

JP     2000316104     11/2000

* cited by examiner

*Primary Examiner*—Michael H. Lee
(74) *Attorney, Agent, or Firm*—McDermott Will & Emery LLP

(57) ABSTRACT

The automatic cut-off system includes a video data processing circuit, a cut-off control circuit, a drive circuit, and a level control section. The video data processing circuit adds a cut-off reference pulse having a predetermined level to primary-color signals of red (R), green (G) and blue (B) at different timings within a single vertical blanking interval, and outputs latch timing signals respectively indicating the timings. The cut-off control circuit shifts a level of each primary-color signal having the cut-off reference pulse added thereto based on a corresponding cut-off control signal. The drive circuit drives each cathode of a CRT (cathode-ray tube) based on a corresponding one of the shifted primary-color signals, and outputs a voltage corresponding to each cathode current as a common feedback signal. The level control section latches the feedback signal in response to each latch timing signal, and outputs the cut-off control signal of one of the primary-color signals.

3 Claims, 7 Drawing Sheets

AUTOMATIC CUT-OFF SYSTEM

BACKGROUND OF THE INVENTION

The present invention generally relates to a color television set. More particularly, the present invention relates to an automatic cut-off system for adjusting the balance of primary-color signals of red (R), green (G) and blue (B) which are applied to a CRT (cathode-ray tube).

Recent color television sets automatically maintain the same current ratio of cathodes of R, G, B as before shipment in order to prevent variation in white balance from being caused by aging of a CRT and drive circuitry. In particular, a system for conducting control so that the black level of each primary-color signal of R, G, B corresponds to a cut-off voltage of the CRT is called an automatic cut-off system.

FIG. 6 is a block diagram of a conventional automatic cut-off system. For simplicity, FIG. 6 shows only circuitry for one of the primary-color signals of R, G, B. A cathode current of a CRT 83 flows through a resistor 84, and a voltage proportional to the cathode current is generated at the resistor 84. A cut-off level detector 92 receives this voltage as a feedback voltage FB0 and outputs the level of the feedback voltage FB0 to a sample-and-hold circuit 93.

A video data processing circuit 81 receives a digitized video signal, a vertical synchronization signal VS and a horizontal synchronization signal HS. The video data processing circuit 81 adds a cut-off reference pulse having a level corresponding to the black level to each of the three primary-color signals of R, G, B and outputs the resultant primary-color signals to a digital-to-analog (D/A) converter 82. The video data processing circuit 81 generates a vertical blanking pulse and a horizontal blanking pulse for output to a logic operation circuit 91. The logic operation circuit 91 generates a timing pulse for sample-and-hold operation based on the vertical blanking pulse and the horizontal blanking pulse, and outputs the timing pulse to the sample-and-hold circuit 93. This timing pulse indicates the timing of the cut-off reference pulse.

The sample-and-hold circuit 93 obtains a current according to the subtraction result of the feedback voltage FB0 from a predetermined reference voltage and applies the current thus obtained to a capacitor for sample-and-hold operation (hereinafter, referred to as sample-and-hold capacitor) 85 within a period of the received timing pulse. In other words, the sample-and-hold capacitor 85 is charged if the feedback voltage FB0 is lower than the reference voltage, and discharged when the feedback voltage FB0 is higher than the reference voltage. The sample-and-hold circuit 93 outputs the voltage of the sample-and-hold capacitor 85 to a cut-off control circuit 95 as a cut-off control voltage.

The D/A converter 82 converts a received signal to an analog signal. The analog signal is applied to the cut-off control circuit 95 through an amplifier 94. The cut-off control circuit 95 conducts cut-off control of the received primary-color signal according to the cut-off control voltage. In other words, the cut-off control circuit 95 shifts the level of the received primary-color signal according to the cut-off control voltage. The cut-off control circuit 95 outputs the resultant primary-color signal to the CRT 83 and drives a corresponding cathode.

FIG. 7 is a waveform chart showing an example of signal waveforms in the circuitry of FIG. 6. The feedback voltage FB0 has pulses according to the cut-off reference pulses in a vertical blanking interval. For simplicity, FIG. 7 shows the level of the tip of the pulses. When a low voltage corresponding to the black level is applied to the CRT 83, a cathode current is small and the feedback voltage FB0 is also small. Since the feedback voltage FB0 detected in the period of the timing pulse for sample-and-hold operation is lower than the reference voltage, the sample-and-hold capacitor 85 is charged in the period of the timing pulse to raise the voltage of the sample-and-hold capacitor 85. This raises the cut-off control voltage and the voltage of the black level. As the voltage of the black level rises, the detected feedback voltage FB0 also rises.

When the feedback voltage FB0 exceeds the reference voltage, the sample-and-hold capacitor 85 is discharged in the period of the timing pulse for sample-and-hold operation to reduce the voltage of the sample-and-hold capacitor 85. This reduces the voltage of the black level. Finally, the detected feedback voltage FB0 becomes equal to the reference voltage, and cut-off control reaches a steady state.

Cut-off control can be conducted automatically by controlling three primary-color signals of R, G, B in the same manner by using the same circuitry as that of FIG. 6.

In the circuit having the above structure, however, it takes a long time to charge the sample-and-hold capacitor 85. Accordingly, white balance cannot be obtained during a period of several hundreds of fields from power-on until the cut-off control reaches a steady state. As a result, an image cannot be displayed in normal colors during this period.

In order to reduce the time required to charge the sample-and-hold capacitor 85, it is necessary to reduce the capacity of the sample-and-hold capacitor 85 and increase a charging current. However, a greater capacity would be better in view of leakage of a current. Moreover, excessively high sensitivity of automatic regulation would destabilize control. Therefore, the charging current cannot be increased so much. This makes it difficult to reduce the time required to charge the sample-and-hold capacitor 85.

SUMMARY OF THE INVENTION

It is an object of the present invention to provide an automatic cut-off system that provides an image having satisfactory white balance in a short time after power-on.

More specifically, according to the present invention, an automatic cut-off system includes a video data processing circuit, a cut-off control circuit, a drive circuit, and a level control section. The video data processing circuit adds a cut-off reference pulse having a predetermined level to primary-color signals of red (R), green (G) and blue (B) at different timings within a single vertical blanking interval, and outputs the resultant signals. The video data processing circuit also outputs latch timing signals respectively indicating the timings. The cut-off control circuit shifts a level of each primary-color signal having the cut-off reference pulse added thereto based on a corresponding cut-off control signal, and outputs the resultant signal. The drive circuit drives each cathode of a CRT (cathode-ray tube) based on a corresponding one of the primary-color signals received from the cut-off control circuit, and outputs a voltage corresponding to a cathode current flowing through each cathode as a common feedback signal. The level control section latches the feedback signal obtained according to each cut-off reference pulse in response to each latch timing signal, and outputs a signal having a level corresponding to the latched value as the cut-off control signal of a corresponding one of the primary-color signals.

In the above automatic cut-off system, each cut-off control signal is obtained based on the value obtained by latching the feedback signal. This eliminates the need to charge a capacitor for sample-and-hold operation, and thus enables significant reduction in time required to provide a stable image having satisfactory white balance after power-on.

The video data processing circuit preferably outputs a selector control signal indicating a timing of separating the cut-off reference pulse to the level control section. The level control section preferably includes a selector, three latch circuits, three subtracters, and three multipliers. The selector receives the feedback signal and separates to output the received feedback signal as outputs of the selector according to the selector control signal within the vertical blanking interval. Each of the three latch circuits receives a corresponding one of the outputs of the selector, latches the received output according to a corresponding one of the latch timing signals, and outputs the latched output. Each of the three subtracters obtains a value indicating a difference between the output of a corresponding one of the latch circuits and a corresponding preset reference value, and individually outputs the value thus obtained. Each of the three multipliers multiplies the output of a corresponding one of the subtracters by a predetermined loop gain and individually outputs the resultant value as the cut-off control signal.

In the above automatic cut-off system, the loop gain can be set to any value for each of the primary-color signals of R, G, B. Accordingly, each loop gain can be easily set to an optimal value.

Preferably, the latch circuits, the subtracters, and the multipliers are formed by a DSP (digital signal processor).

DETAILED DESCRIPTION OF THE INVENTION

Hereinafter, embodiments of the present invention will be described with reference to the accompanying drawings.

Figure 1:
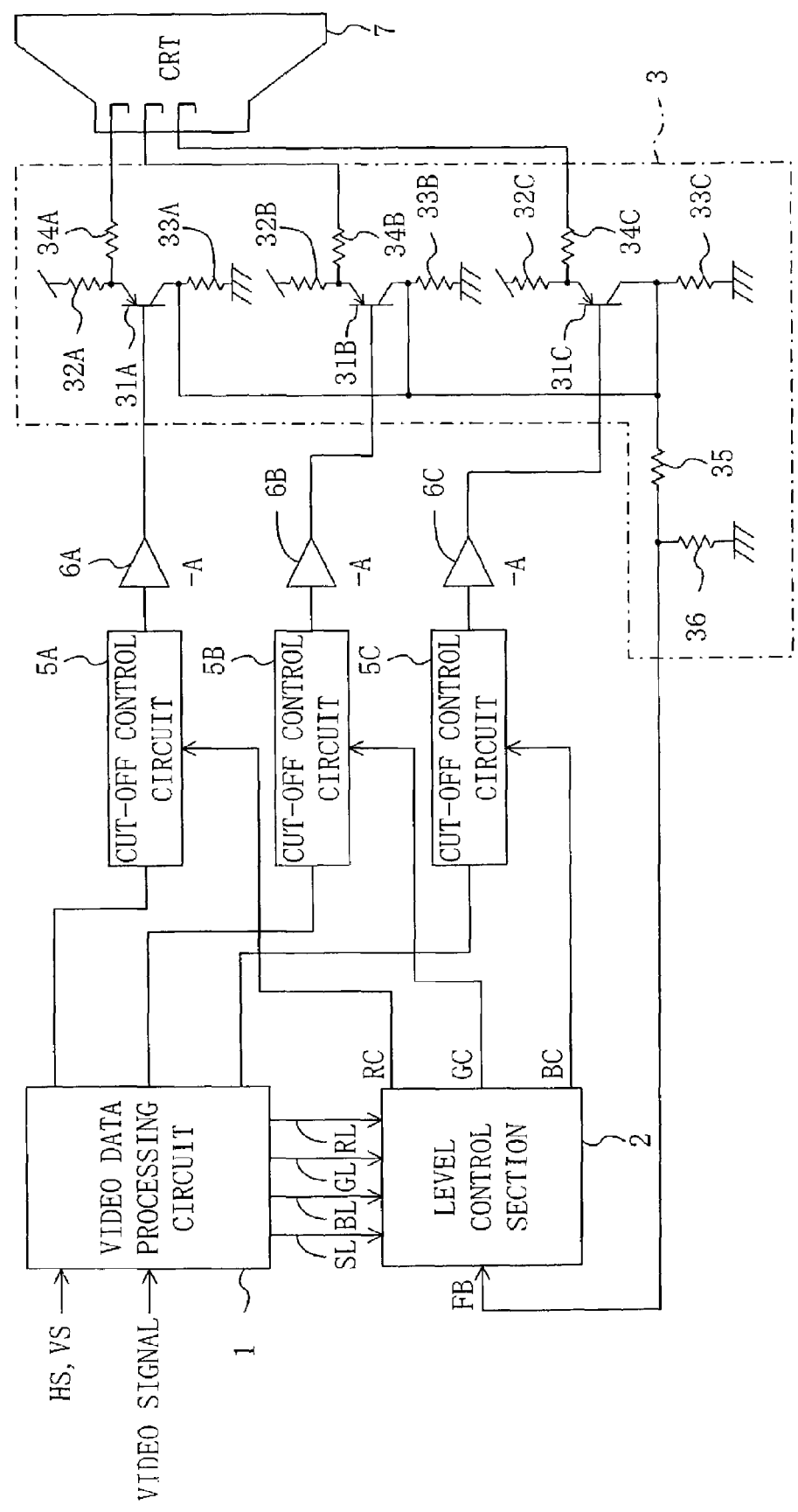
FIG. 1 is a block diagram showing the structure of an automatic cut-off system according to an embodiment of the present invention.

FIG. 1 is a block diagram showing the structure of an automatic cut-off system according to an embodiment of the present invention. The automatic cut-off system of FIG. 1 includes a video data processing circuit 1, a level control section 2, a drive circuit 3, cut-off control circuits 5A, 5B, 5C, inverting amplifiers 6A, 6B, 6C, and a CRT (cathode-ray tube) 7. The drive circuit 3 includes transistors 31A, 31B, 31C and resistors 32A, 32B, 32C, 33A, 33B, 33C, 34A, 34B, 34C, 35, 36.

The video data processing circuit 1 receives a digitized video signal, a vertical synchronization signal VS and a horizontal synchronization signal HS. The video data processing circuit 1 generates a vertical blanking pulse and a horizontal blanking pulse based on the vertical synchronization signal VS and the horizontal synchronization signal HS. The video data processing circuit 1 separates the video signal into primary-color signals of R, G, B (hereinafter, sometimes referred to as R signal, G signal and B signal, respectively), and then adds a cut-off reference pulse having a predetermined level to the primary-color signals at different timings within the same vertical blanking interval. The video data processing circuit 1 then converts the resultant primary-color signals to analog signals for output to the cut-off control circuits 5A, 5B, 5C, respectively.

The video data processing circuit 1 outputs latch timing signals RL, GL, BL and a selector control signal SL to the level control section 2. The latch timing signals RL, GL, BL indicate the timing of the cut-off reference pulse of the R, G, B signals, respectively. The selector control signal SL is in synchronization with the latch timing signals RL, GL, BL and indicates the timing of separating the cut-off reference pulse of each primary-color signal.

In response to a cut-off control signal RC from the level control section 2, the cut-off control circuit 5A conducts cut-off control of the R signal received from the video data processing circuit 1, that is, shifts the level of the R signal, and outputs the resultant R signal to the inverting amplifier 6A. Similarly, in response to a cut-off control signal GC from the level control section 2, the cut-off control circuit 5B conducts cut-off control of the G signal received from the video data processing circuit 1 and outputs the resultant G signal to the inverting amplifier 6B. In response to a cut-off control signal BC from the level control section 2, the cut-off control circuit 5C conducts cut-off control of the B signal received from the video data processing circuit 1 and outputs the resultant B signal to the inverting amplifier 6C.

The inverting amplifier 6A inverts and amplifies the received signal for output to the transistor 31A of the drive circuit 3. The transistor 31A drives a cathode for R signal in the CRT 7 through the resistor 34A. Similarly, the inverting amplifiers 6B, 6C invert and amplify the received signal for output to the transistors 31B, 31C of the drive circuit 3, respectively. The transistor 31B drives a cathode for G signal in the CRT 7 through the resistor 34B. The transistor 31C drives a cathode for B signal in the CRT 7 through the resistor 34C.

The collectors of the transistors 31A, 31B, 31C are connected to one end of the resistor 35. The other end of the resistor 35 is connected to one end of the resistor 36. The other end of the resistor 35 is connected also to the level control section 2 in order to apply a feedback signal FB thereto. The other end of the resistor 36 is grounded.

Figure 2:
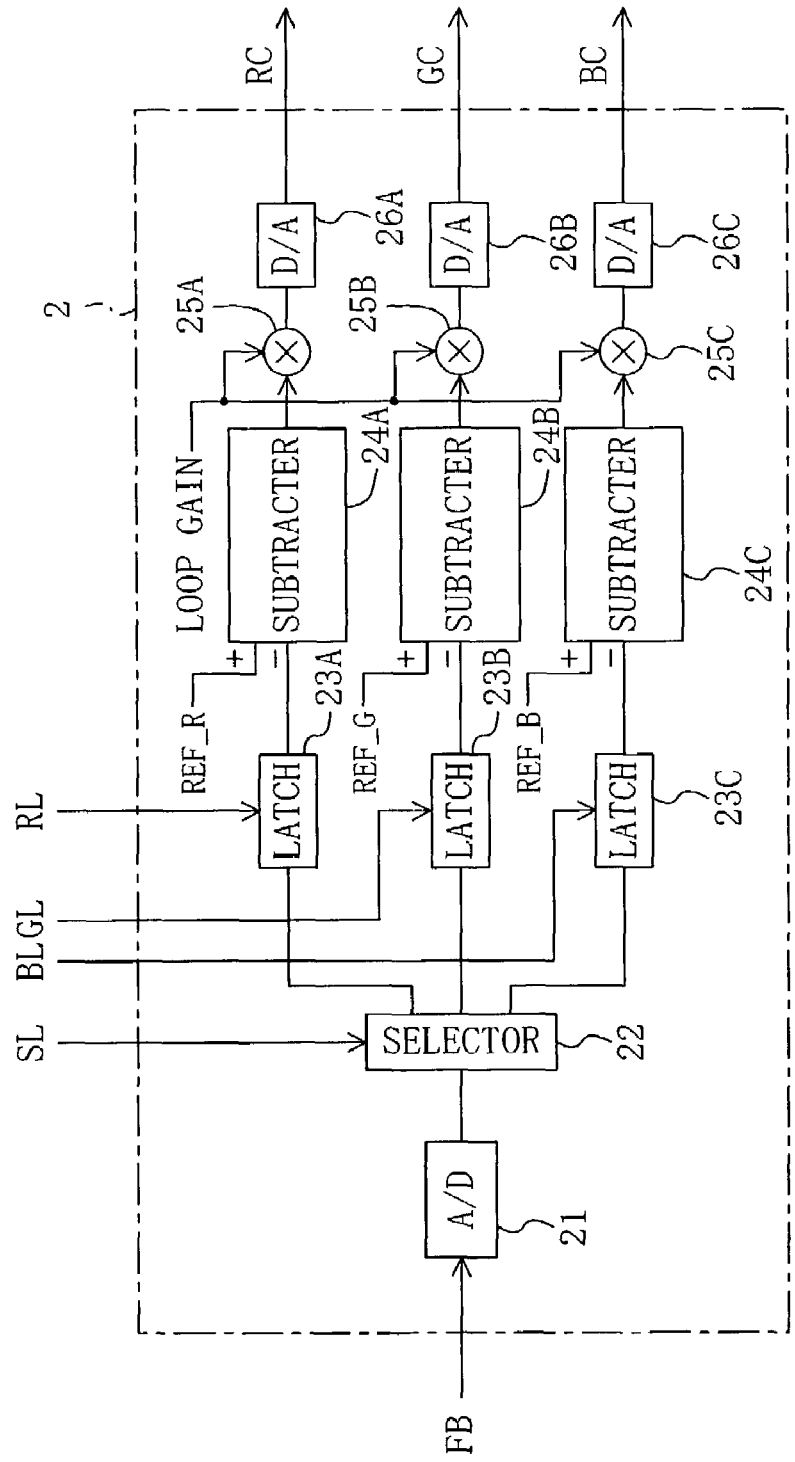
FIG. 2 is a block diagram showing the structure of a level control section in FIG. 1.

FIG. 2 is a block diagram showing the structure of the level control section 2 in FIG. 1. As shown in FIG. 2, the level control section 2 includes an analog-to-digital (A/D) converter 21, a selector 22, latch circuits 23A, 23B, 23C, subtracters 24A, 24B, 24C, multipliers 25A, 25B, 25C, and digital-to-analog (D/A) converters 26A, 26B, 26C. The latch circuit 23A, the subtracter 24A, the multiplier 25A and the D/A converter 26A generate a cut-off control signal RC for R signal. Similarly, the latch circuit 23B, the subtracter 24B, the multiplier 25B and the D/A converter 26B generate a cut-off control signal GC for G signal. The latch circuit 23C, the subtracter 24C, the multiplier 25C and the D/A converter 26C generate a cut-off control signal BC for B signal.

Figure 3:
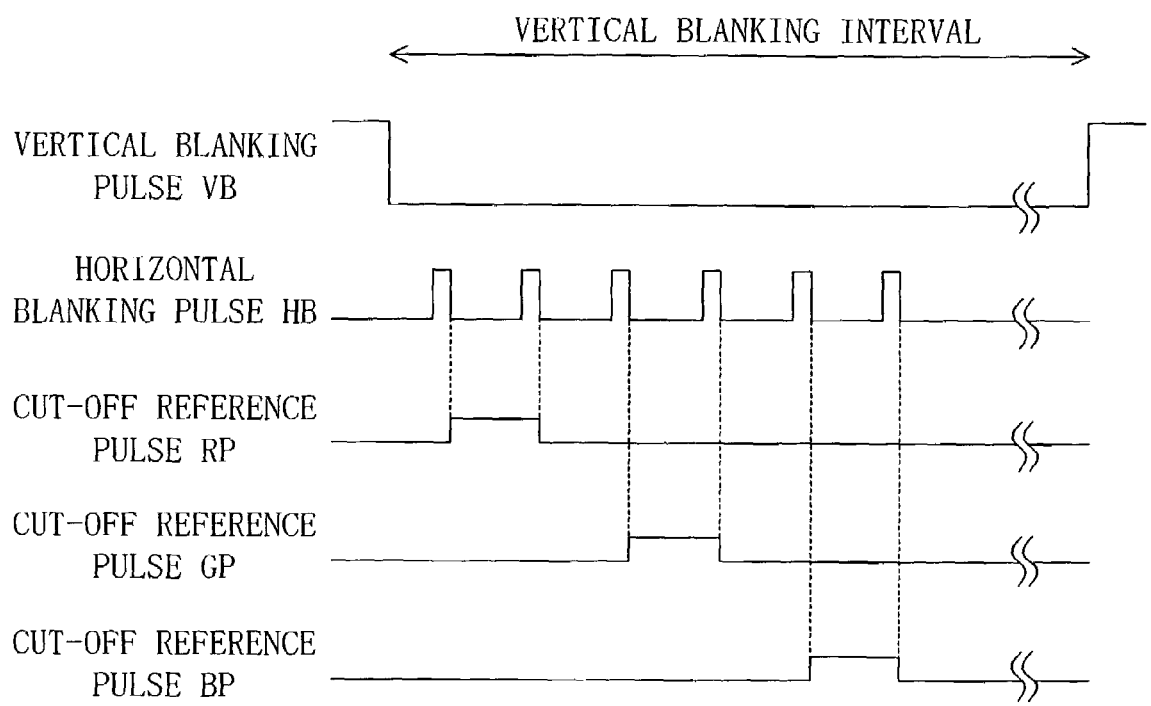
FIG. 3 is a timing chart of cut-off reference pulses which are respectively added to primary-color signals by a video data processing circuit.

FIG. 3 is a timing chart of cut-off reference pulses which are respectively added to the primary-color signals by the video data processing circuit 1. The video data processing circuit 1 generates a vertical blanking pulse VB and a horizontal blanking pulse HB based on a vertical synchronization signal VS and a horizontal synchronization signal HS. In a vertical blanking interval, the video data processing circuit 1 adds the cut-off reference pulses RP, GP, BP each having a predetermined level to the R, G and B signals at different timings, respectively.

Each of the cut-off reference pulses RP, GP, BP has a width equal to a single horizontal synchronization period (1H), and a height corresponding to the black level of a corresponding one of the R, G and B signals. The cut-off reference pulses RP, GP, BP are in synchronization with the horizontal blanking pulse HB. The cut-off reference pulses RP, GP, BP are applied at intervals of 1H so that the periods of the cut-off reference pulses RP, GP, BP do not overlap each other. The cut-off reference pulses RP, GP, BP are respectively applied to the cathodes for R, G, B in the CRT 7 through the cut-off control circuits 5A, 5B, 5C, the inverting amplifiers 6A, 6B, 6C, and the transistors 31A, 31B, 31C.

A current of a corresponding cathode flows through the emitter of each transistor 31A, 31B, 31C. Since the collectors of the transistors 31A, 31B, 31C are connected to the resistor 35, the sum of the currents of the cathodes for R, G, B flows through the resistors 35, 36. It is herein assumed that the resistors 33A, 33B, 33C have a relatively high resistance value and the influence of these resistors is ignored. A voltage proportional to the sum of the cathode currents is generated at the resistor 36. This voltage is applied to the level control section 2 as a feedback signal FB that is common to each primary-color signal.

Figure 4:
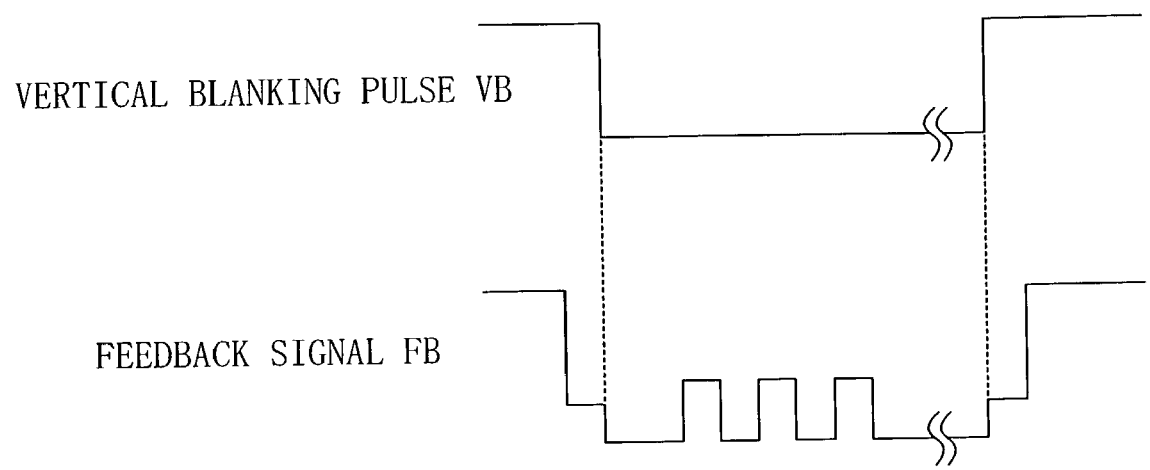
FIG. 4 is a waveform chart of a feedback signal in a vertical blanking interval.

FIG. 4 is a waveform chart of the feedback signal FB in a vertical blanking interval. A cathode current flows through the cathodes for R, G, B in the CRT 7 according to the cut-off reference pulses RP, GP, BP, respectively. The sum of the cathode currents is converted to a voltage in the resistor 36 and appears as three pulses of the feedback signal FB as shown in FIG. 4. The video data processing circuit 1 controls the latch timing signals RL, GL, BL so that the respective pulses of the latch timing signals RL, GL, BL rise during the period of the cut-off reference pulses RP, GP, BP, respectively.

Referring back to FIG. 2, the A/D converter 21 in the level control section 2 converts the received feedback signal FB into a digital signal for output to the selector 22. The selector 22 outputs the received feedback signal FB sequentially to the latch circuits 23A, 23B, 23C according to the selector control signal SL. In this case, the three pulses of the feedback signal FB in FIG. 4 are separated, namely, sequentially output to the latch circuits 23A, 23B, 23C one by one in the same vertical blanking interval. The latch circuits 23A, 23B, 23C respectively latch the values of the feedback signal FB at different timings.

First, the circuitry for generating the cut-off control signal RC for R signal will be described. The latch circuit 23A latches a signal received from the selector 22 at a rising edge of the latch timing signal RL and outputs the latched signal to the subtracter 24A. Accordingly, the latch circuit 23A latches a value corresponding to the magnitude of an actual cathode current flowing according to the cut-off reference pulse RP.

The subtracter 24A obtains a value indicating the subtraction result of the output of the latch circuit 23A from a preset reference value REF_R for R signal, and outputs the value thus obtained to the multiplier 25A. For example, the subtracter 24A adds a predetermined value to the subtraction result and outputs the resultant value to the multiplier 25A. The multiplier 25A obtains the product of a predetermined loop gain and the output of the subtracter 24A for output to the D/A converter 26A. The D/A converter 26A converts the received value to an analog signal for output to the cut-off control circuit 5A as a cut-off control signal RC. Accordingly, sensitivity of the cut-off control is determined according to the loop gain value.

When the loop gain value is large, the difference between the output of the latch circuit 23A and the reference value REF_R can be reduced with a small number of loops, that is, in a short time. In this case, however, excellent stability is not obtained after this difference almost converges to zero, that is, after the automatic cut-off control is completed. On the other hand, when the loop gain value is small, it takes a long time for the difference to converge to zero, but excellent stability is obtained after convergence. As shown in FIG. 2, the loop gain can be set to any value. Therefore, the loop gain can be easily set to an optimal value.

The loop gain may be varied according to the output of the subtracter 24A. For example, the loop gain may be increased when the difference between the output of the latch circuit 23A and the reference value REF_R is large, and may be reduced when the difference is small. This reduces the time required for convergence. Moreover, the loop gain value is reduced after convergence, resulting in improved stability.

The same applies to the circuitry for generating the cut-off control signal GC for G signal. The latch circuit 23B latches a signal received from the selector 22 at a rising edge of the latch timing signal GL and outputs the latched signal to the subtracter 24B. Accordingly, the latch circuit 23B latches a value corresponding to the magnitude of an actual cathode current flowing according to the cut-off reference pulse GP.

The subtracter 24B obtains a value indicating the subtraction result of the output of the latch circuit 23B from a reference value REF_G for G signal, and outputs the value thus obtained to the multiplier 25B. The multiplier 25B obtains the product of a predetermined loop gain and the output of the subtracter 24B for output to the D/A converter 26B. The D/A converter 26B converts the received value to an analog signal for output to the cut-off control circuit 5B as a cut-off control signal GC.

The same applies to the circuitry for generating the cut-off control signal BC for B signal. The latch circuit 23C latches a signal received from the selector 22 at a rising edge of the latch timing signal BL and outputs the latched signal to the subtracter 24C. Accordingly, the latch circuit 23C latches a value corresponding to the magnitude of an actual cathode current flowing according to the cut-off reference pulse BP.

The subtracter 24C obtains a value indicating the subtraction result of the output of the latch circuit 23C from a reference value REF_B for B signal, and outputs the value thus obtained to the multiplier 25C. The multiplier 25C obtains the product of a predetermined loop gain and the output of the subtracter 24C for output to the D/A converter 26C. The D/A converter 26C converts the received value to an analog signal for output to the cut-off control circuit 5C as a cut-off control signal BC.

Different loop gain values may be used for the R, G and B signals. Using optimal loop gain values for the R, G and B signals enables white balance to be adjusted in a short time and ensures stable operation.

The cut-off control circuit 5A shifts the level of the received R signal so that the R signal has a higher value as the cut-off control signal RC has a higher value. Similarly, the cut-off control circuit 5B shifts the level of the received G signal so that the G signal has a higher value as the cut-off control signal GC has a higher value. The cut-off control circuit 5C shifts the level of the received B signal so that the B signal has a higher value as the cut-off control signal BC has a higher value.

Figure 5:
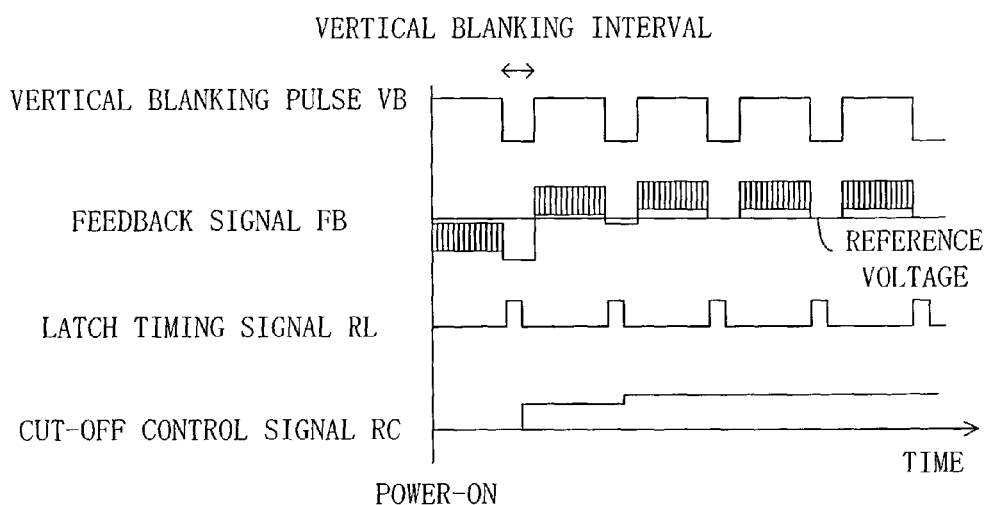
FIG. 5 is a waveform chart showing an example of signal waveforms in the automatic cut-off system in FIG. 1.
Figure 6:
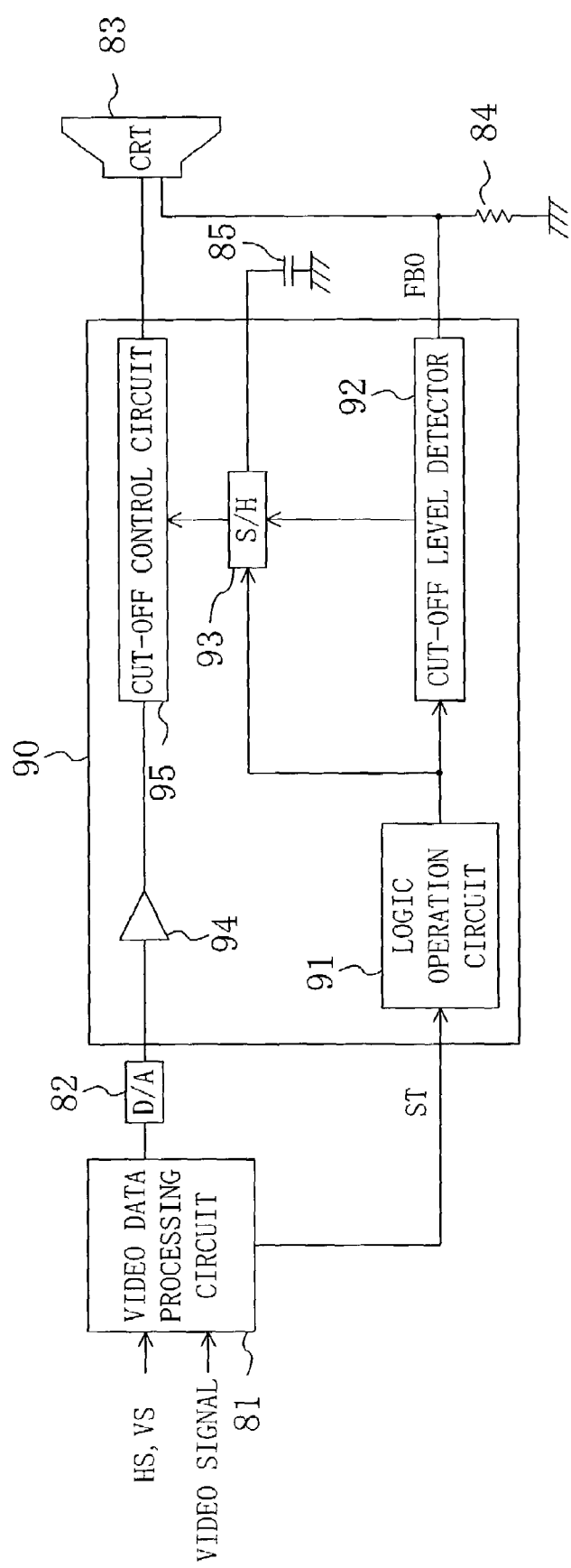
FIG. 6 is a block diagram of a conventional automatic cut-off system.
Figure 7:
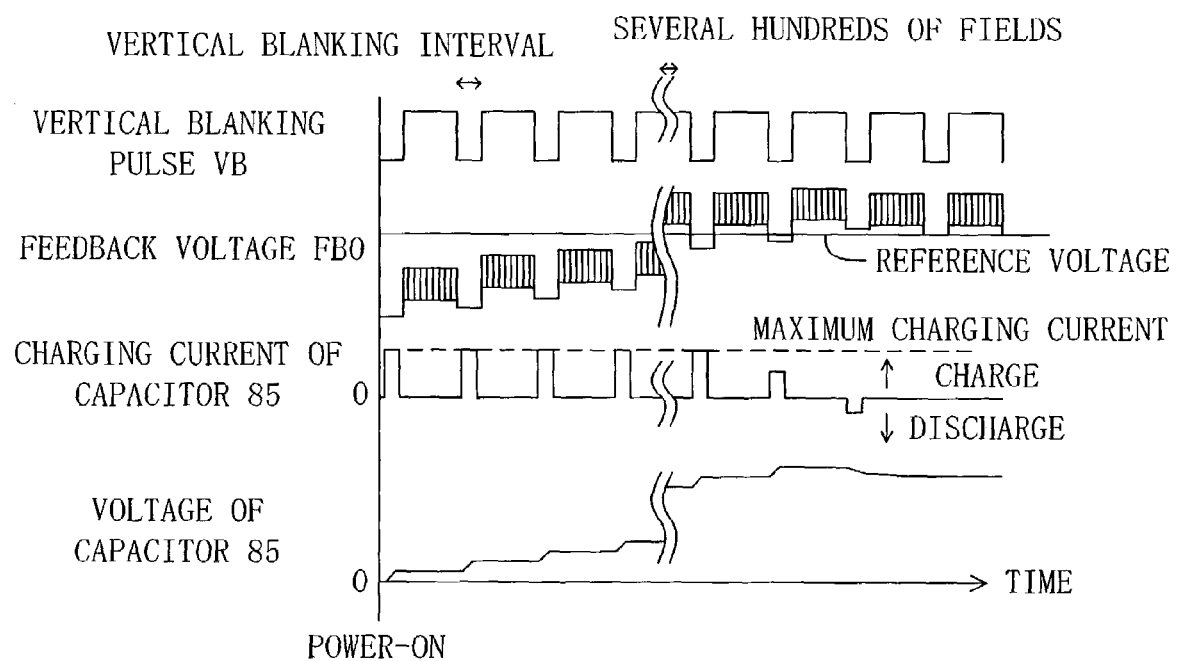
FIG. 7 is a waveform chart showing an example of signal waveforms in the circuitry of FIG. 6.

FIG. 5 is a waveform chart showing an example of signal waveforms in the automatic cut-off system of FIG. 1. Herein, description will be given only for the R signal. As shown in FIG. 4, the feedback signal FB has pulses according to the cut-off reference pulses RP, GP, BP in a vertical blanking interval. For simplicity, FIG. 5 shows the level of the tip of the pulses.

Provided that the voltage of the black level of the R signal is low upon power-on, a cathode current is small and the feedback signal FB has a small value. In this case, the value latched by the latch circuit 23A according to the latch timing signal RL in a vertical blanking interval is smaller than the reference value REF_R. A signal having a level corresponding to the difference between the feedback signal FB and the reference value REF_R is applied to the cut-off control circuit 5A as a cut-off control signal RC. The cut-off control circuit 5A raises the level of the R signal.

As a result, the voltage of the black level of the R signal rises, whereby the feedback signal FB for the R signal rises. When the value latched by the latch circuit 23A exceeds the reference value REF_R, the level of the cut-off control signal RC is reduced.

If such control is repeatedly conducted and the latched feedback signal FB becomes equal to the reference value REF_R, the cut-off control signal RC has a fixed level and the cut-off control reaches a stable, steady state. The same applies to the G signal and the B signal. White balance is obtained when the cut-off control of each of the R, G, B signals reaches a steady state.

As has been described above, according to the present embodiment, a cut-off control signal is obtained based on the value obtained by latching the feedback signal FB. This eliminates the need to charge and discharge the capacitor, and reduces the time required to provide an image having satisfactory white balance. In particular, appropriately setting the loop gain value allows the cut-off control to reach a steady state based on the feedback signal FB in the first vertical blanking interval after power-on. As a result, a stable image having approximately satisfactory white balance can be provided in the second field and the following fields.

Note that, in the automatic cut-off system of FIGS. 1 and 2, the latch circuits 23A, 23B, 23C, the subtracters 24A, 24B, 24C and the multipliers 25A, 25B, 25C may be formed by a DSP. The video data processing circuit 1 may be formed by a DSP.

As has been described above, according to the present invention, a color television set capable of providing a stable image having satisfactory white balance in a short time after power-on and capable of obtaining accurate white balance can be provided.

What is claimed is:

1. An automatic cut-off system, comprising:
   a video data processing circuit for adding a cut-off reference pulse having a predetermined level to primary-color signals of red (R), green (G) and blue (B) at different timings within a single vertical blanking interval, and outputting the resultant signals, and also outputting latch timing signals respectively indicating the timings;
   a cut-off control circuit for shifting a level of each primary-color signal having the cut-off reference pulse added thereto based on a corresponding cut-off control signal and outputting the resultant signal;
   a drive circuit for driving each electrode of a display based on a corresponding one of the primary-color signals received from the cut-off control circuit, and outputting a voltage corresponding to a cathode current flowing through each cathode as a common feedback signal; and
   a level control section for latching the feedback signal obtained according to each cut-off reference pulse in response to each latch timing signal and outputting a signal having a level corresponding to the latched value as the cut-off control signal of a corresponding one of the primary-color signals,
   wherein the video data processing circuit outputs a selector control signal indicating a timing of separating the cut-off reference pulse to the level control section, and the level control section includes:
      a selector for receiving the feedback signal and separating to output the received feedback signal as outputs of the selector according to the selector control signal within the vertical blanking interval;
      three latch circuits each receiving a corresponding one of the outputs of the selector, latching the received output according to a corresponding one of the latch timing signals, and outputting the latched output;
      three subtractors each obtaining a value indicating a difference between the output of a corresponding one of the latch circuits and a corresponding preset reference value, and individually outputting the value thus obtained; and
      three multipliers each multiplying the output of a corresponding one of the subtractors by a predetermined loop gain and individually outputting the resultant value as the cut-off control signal.

2. The automatic cut-off system according to claim 1, wherein the latch circuits, the subtractors, and the multipliers are formed by a DSP (digital signal processor).

3. The automatic cut-off system according to claim 1, wherein each electrode of the display is a cathode of a CRT (cathode-ray tube).

* * * * *